(12) United States Patent
Adam

(10) Patent No.: US 7,527,000 B2
(45) Date of Patent: May 5, 2009

(54) SYSTEM FOR TRANSPORTING VEHICLES ON RAILS BY GRAVITY

(76) Inventor: Gérard Adam, Rue des Vergers 18, Halanzy (BE) 6792

( * ) Notice: Subject to any disclaimer, the term of this patent is extended or adjusted under 35 U.S.C. 154(b) by 318 days.

(21) Appl. No.: 10/595,448

(22) PCT Filed: Oct. 21, 2004

(86) PCT No.: PCT/EP2004/052602

§ 371 (c)(1), (2), (4) Date: Apr. 20, 2006

(87) PCT Pub. No.: WO2005/040015

PCT Pub. Date: May 6, 2005

(65) Prior Publication Data

US 2007/0089634 A1      Apr. 26, 2007

(30) Foreign Application Priority Data

Oct. 23, 2003   (BE) ................................ 2003/0566

(51) Int. Cl.
*E01B 25/00* (2006.01)
*B61B 3/00* (2006.01)
*E01B 25/14* (2006.01)
*E01B 25/16* (2006.01)
*A63G 21/22* (2006.01)

(52) U.S. Cl. ......................... 104/89; 104/91; 104/113; 104/164

(58) Field of Classification Search ................... 104/89, 104/91, 113, 164
See application file for complete search history.

(56) References Cited

U.S. PATENT DOCUMENTS 2,593,699 A * 4/1952 Rose ........................... 104/91
4,351,241 A   9/1982 Brems et al.

FOREIGN PATENT DOCUMENTS

| DE | 32 43 407 A1 | 5/1984 |
| GB | 331 386 | 4/1921 |
| GB | 1 294 843 | 11/1972 |

* cited by examiner

*Primary Examiner*—S. Joseph Morano
*Assistant Examiner*—Daniel V Venne
(74) *Attorney, Agent, or Firm*—Sughrue Mion, PLLC

(57) ABSTRACT

The invention relates to a transport system, comprising a transport track (9), made of at least one rail, at least one vehicle to be transported and a rolling device, whereby said vehicle, provided with the rolling device, has a rolling resistance on said rail, said transport track comprises several descending sections (14', 14", 14'''), having a descending gradient which is sufficient to increase the rolling resistance and insufficient to generate a continuous acceleration of the vehicle on the rail and ascending sections (12', 12", 12''') and whereby the transport track has a course, along which no vehicle at a point is lifted higher than the altitude of said vehicle at this point on a transport track with a single descending section, having the aforementioned gradient.

8 Claims, 4 Drawing Sheets

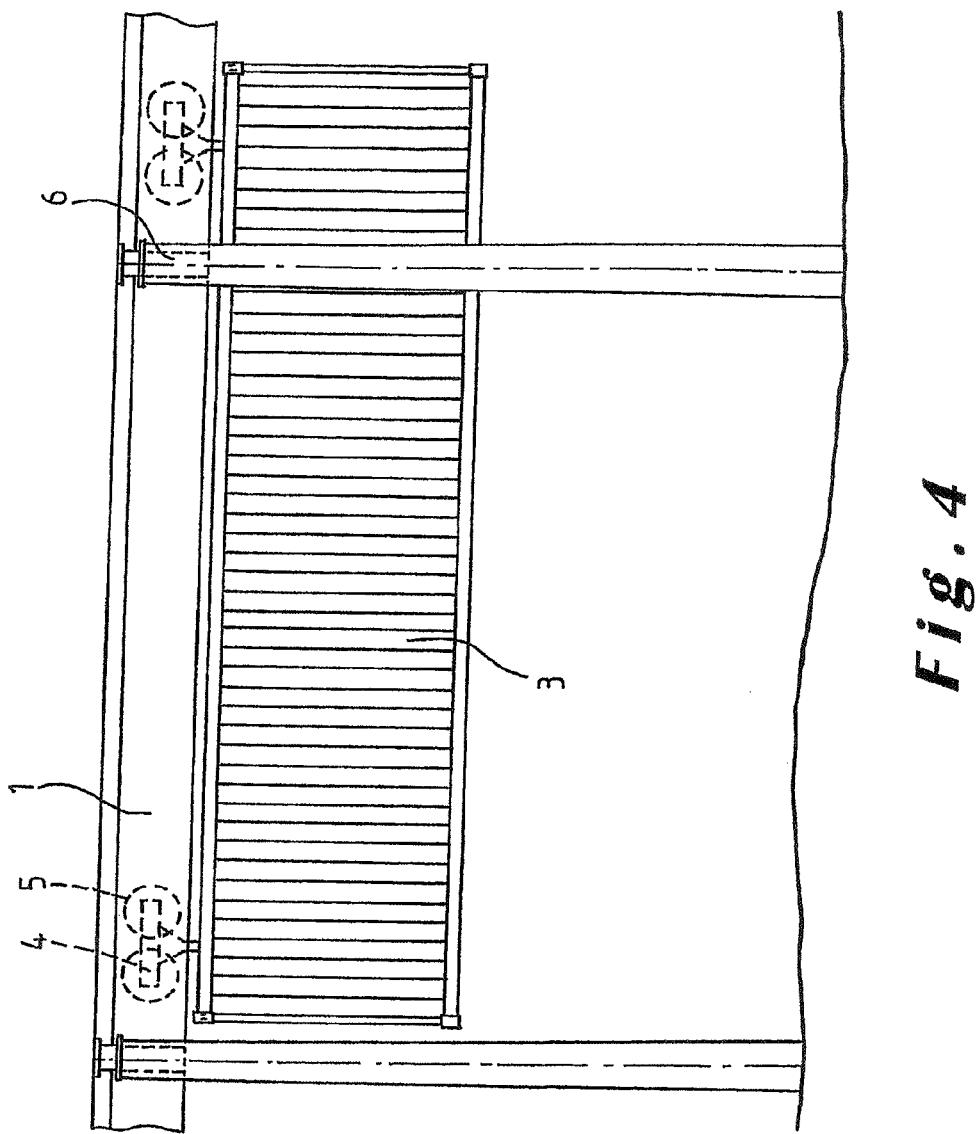
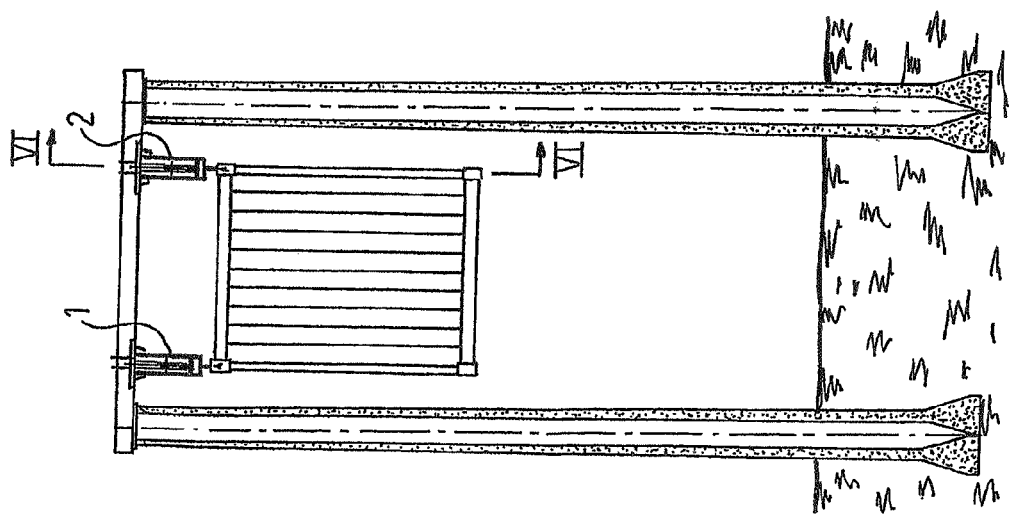

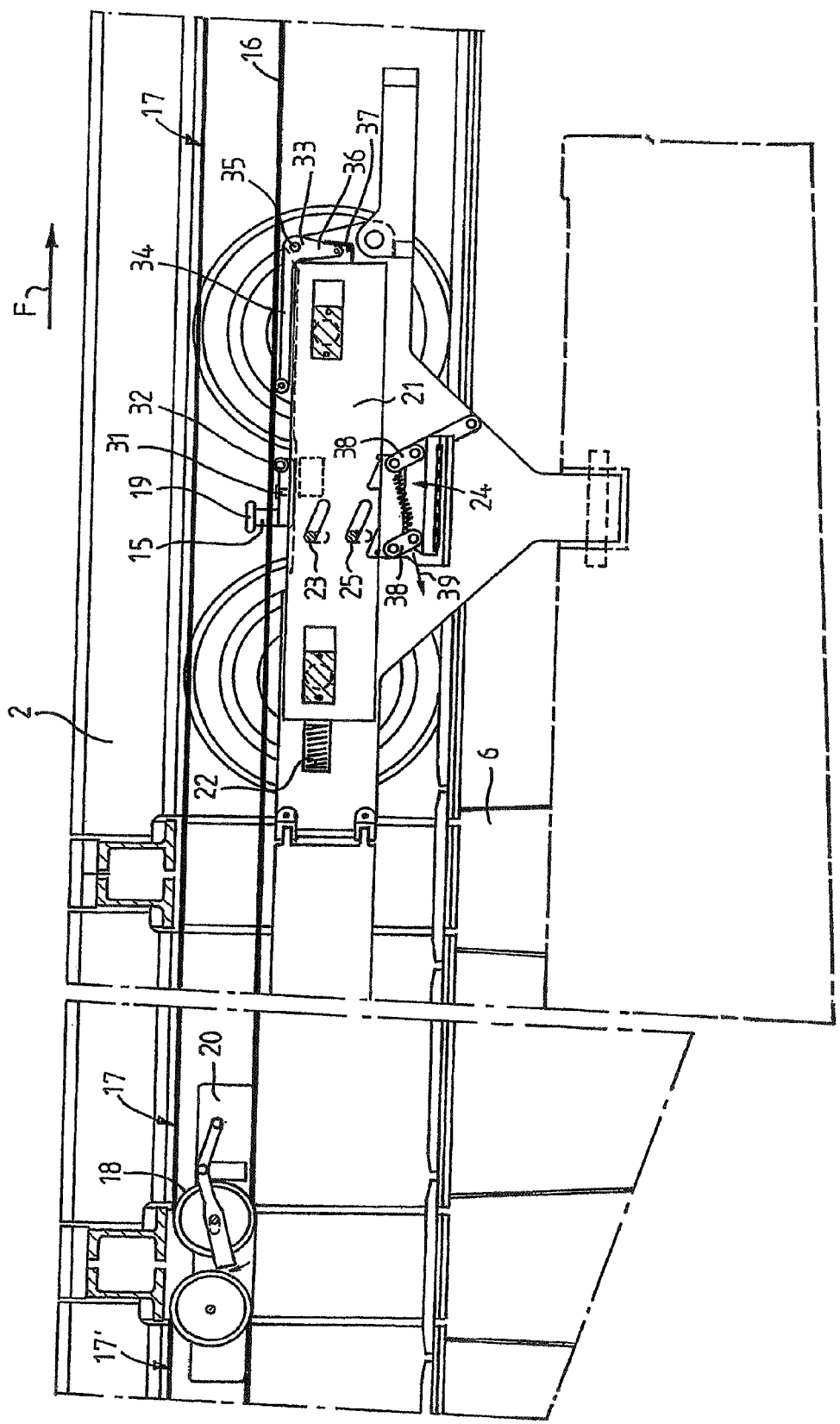

SYSTEM FOR TRANSPORTING VEHICLES ON RAILS BY GRAVITY

BACKGROUND OF THE INVENTION

The present invention relates to a transport system, comprising
  a transport track formed by at least one running rail,
  at least one vehicle to be transported, and
  a rolling device connected to each vehicle and arranged on the said at least one running rail so as to be able to run thereon, the vehicle provided with the rolling device having a resistance to running on the said at least one rail,
  the said transport track having at least one descending track section having sufficient slope so that the resistance to running of each vehicle is overcome, each vehicle thus running on the said at least one descending section by simple gravity.

Rail transport systems have already been known for a long time, in the form of railway lines. On railway lines, the resistance to running of vehicles on wheels is very favourable in comparison with that of vehicles with engines travelling on the road. However, the route followed by these railway lines involves a constant driving of wagons in circulation by a locomotive, either to pull them in the case of upward slopes or to brake them in the case of downward slopes. The result is a great consumption of energy for traction and a great dissipation of energy for braking. The locomotive itself has a heavy weight which it is necessary to move and brake with the rest of the convoy.

Transport systems are also known of the type with devices provided in fairs or amusement parks, called "big dippers". The slopes of these devices are used to obtain very violent accelerations in descent, intended to cause fright in the passengers of the vehicles travelling. A large part of the energy accumulated in descent is used immediately in order to climb a following "mountain" as high as possible, without having to use a driving means. Consequently the distances travelled on such an installation are relatively short.

Transport systems are also known, as indicated at the start (see for example FR-1602034 and FR-2235068). These systems are designed solely for the gravity descent of vehicles on a transport track and specific braking devices are provided to slow down the speed of the vehicles in the course of making their descent, which causes an outward dissipation of energy.

In U.S. Pat. No. 2,593,699 a transport system to be used in business premises and arranged in an endless loop is described. When the transport track reaches an excessively low level compared with the floor of the premises, it has rising sections of track on which the vehicles are driven upwards over a short distance.

None of the elements of the prior art deal with transport over a long distance on routes with variable elevations between the starting point and the arrival point. Many prior documents have provided for a descent of vehicles by gravity along a transport track, without envisaging a route where the difference in elevation between starting point and arrival point is zero or negative.

SUMMARY OF THE INVENTION

The aim of the present invention is to develop a vehicle transport system which makes it possible to organise the most parsimonious possible use of potential energies, and in particular gravity, and a maximum use of natural elevations. This system should advantageously allow the non-river transportation of specific vehicles or containers, to standard dimensions or not, at controlled speed and traffic, and this preferably over a long distance, for example several kilometres.

This problem has been resolved according to the invention by a transport system of the type indicated at the start, in which the transport track has a starting point and an arrival point having an elevation equal to or higher than the starting point, and comprises several sections of descending track between which there is in each case arranged a section of ascending track on which each vehicle provided with the rolling device is driven by a driving device, the slope of each section of descending track being insufficient to produce a continuous acceleration of the said at least one vehicle on the said at least one running rail, each vehicle having there a substantially constant speed, balanced by the said resistance to running with other resistances added, such as the resistance to air of the vehicle, the transport track having a route along which no vehicle at any point is raised higher than the elevation that the vehicle would have at this point on the transport track having a single descending section provided with the above mentioned slope between the starting point and the arrival point.

In the case of flat terrain, it is possible for example to envisage, before the first section of descending tract, an ascending section of track, which initiates the descent movement on the first descending section of track.

When the departure point has an elevation equal to or lower than the arrival point, it suffices to calculate the route of the track according to the elevation, so that there are as few ascending sections as possible. It is nevertheless necessary for no vehicle to be at a point raised higher than the elevation that the vehicle would have at this point on a track having a single descending section between the starting point and the arrival point and provided with the required slope according to the invention.

The production of such routes makes it possible to avoid uneven terrain as far as possible and therefore successive abrupt energy-consuming descents and climbs from one point to another when a direct line is taken.

The vehicles according to the invention are moved on the descending sections with only an extremely minimal energy dissipation due to the friction of the rolling device on the rail or rails since there is no need for braking.

Advantageously, the above-mentioned slope is greater than $3/1000$, preferably at least $4/1000$, in order to overcome the resistance to running of a vehicle with metal wheels running on one or more steel rails.

At a slope of $4/1000$, the speed of the vehicle will, after a slight acceleration of very short duration, acquire a substantially constant speed, for example around 30 to 50 km/h, preferably around 40 km/h.

The slope of the descending track sections is therefore preferably continuous. In this way, the vehicles running on it at constant speed remain, during their movement by gravity, at a substantially continuous distance from one another. Preferably the running on the ascending sections takes place at this same constant speed.

By virtue of this extremely gentle slope at very close lower and upper limits, the vehicle can travel a maximum distance between the departure point of the descending track section and its arrival point, without any expenditure of non-renewable energy.

According to the invention, the vehicle provided with the rolling device is driven by a driving device that can be carried by the vehicle or the rolling device itself and start up as soon as an ascending slope is detected, and then stop as soon as a descending slope is detected. The driving device can also advantageously be carried by the rail or rails on the ascending section and cooperate with any vehicle or rolling device accessing this ascending section, whilst remaining stopped as soon as no vehicle is detected on this section. It is also possible to provide any appropriate driving device mounted close to the ascending sections at any point enabling cooperation with the container as soon as the latter approaches.

According to one advantageous embodiment of the invention, the transport track comprises overhead rail support means, at least on certain sections, and the vehicle is suspended from this overhead rail by the rolling device. This type of support means is very lightweight in terms of infrastructure and adapts very easily to variations in elevation on the terrain.

Advantageously, the vehicle to be transported is a container, preferably a container with standard overall dimensions. This container can also be provided with standard corner elements, of the type in accordance with ISO standards, which make it possible to exert external traction and compression forces on the container. The rolling device can be fixed to the container in a foldable form in the volume formed by the overall dimensions of the container. In this way, it does not get in the way during the stacking or handling of the containers. The rolling device can also be independent of the container and be fixed to it at the start of the track, either for example by means of a fixing frame known per se which is capable of being attached to the above-mentioned corner elements, or directly, without any intermediate frame, to the corner elements.

This vehicle can also be outside any standard and adapted to the particular requirements of a company.

This vehicle can also be a lorry trailer, a complete lorry, a mobile home or new vehicle intended for tourism by this method of transport.

According to an improved embodiment of the invention, the transport system transports several vehicles on the transport track and comprises means of balancing the speed of two successive vehicles, having the effect of maintaining the distance between the vehicles.

Other embodiments of the transport system according to the invention are indicated in the accompanying claims.

The invention also concerns a use of a transport system as indicated above, for transporting vehicles over long distances using potential energies parsimoniously, this use comprising a reading of the elevation between the starting point and the arrival point and a determination of the route of the transport track on the basis of this reading, so that the said track has the said slope on the said descending sections and a minimum number of ascending sections.

Other details and particularities of the invention will emerge from the description of example embodiments of the invention given below, non-limitingly and with reference to the drawings.

BRIEF DESCRIPTION OF THE DRAWINGS

FIGS. 3 and 4 depict a lateral view and a front view of a container suspended in this transport system according to the invention.

FIG. 6 depicts a view in partial section along the line VI-VI in FIG. 3.

DETAILED DESCIPTION OF THE DRAWINGS

In the various drawings the identical or similar elements are designated by the same references. It should be noted that the figures are not to scale.

Figure 5:
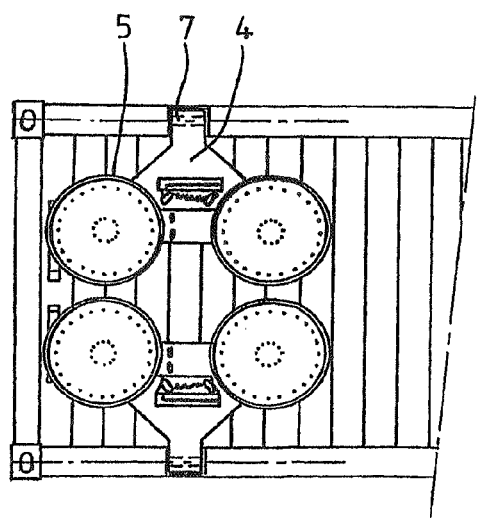
FIG. 5 depicts, in a partial plan view, the rolling device of a container applicable in a transport system according to the invention.

As can be seen in particular in FIGS. 3 to 5, the illustrated example embodiment of a transport system according to the invention comprises a transport track formed, in this case, from two running rails 1 and 2, a vehicle to be transported in the form of a container 3 and a rolling device comprising four bogies 4 each supporting four wheels 5. The running wheels are, in the example illustrated, disposed so as to form an overhead track and, for this purpose, are supported by gantries 6 disposed at regular intervals.

The bodies of the rolling device, in the example embodiment illustrated in FIG. 5, are connected by a hinge 7 to the chassis of the container 5 and are folded over the roof of the container 3 by pivoting, so as to be retracted in the overall volume of the container.

Figure 1:
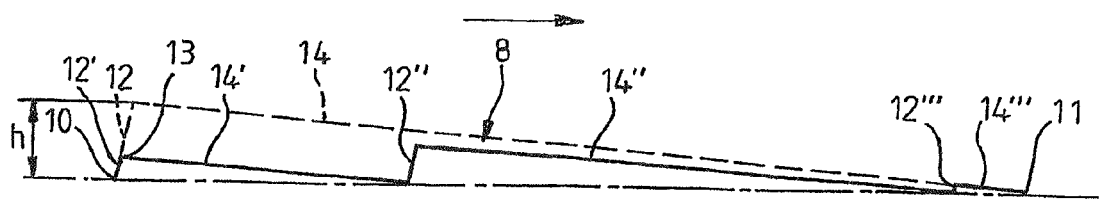
FIGS. 1 and 2 depict schematically two tracks according to the invention.
Figure 2:
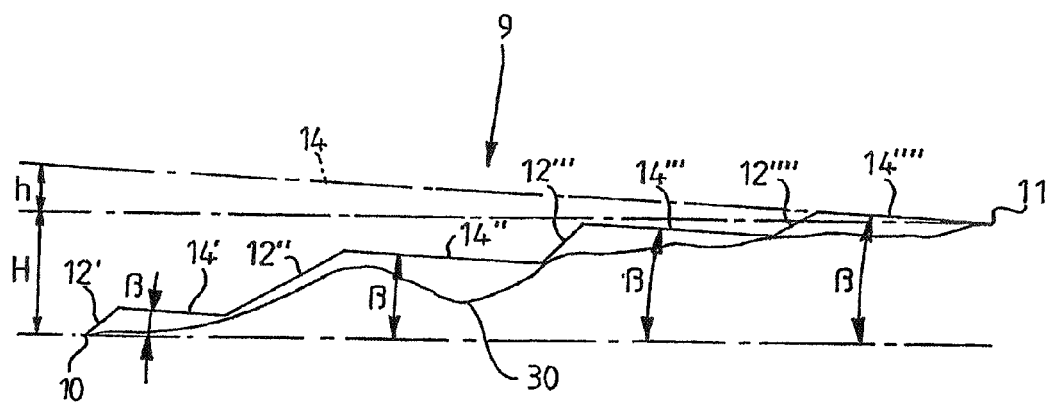

FIGS. 1 and 2 depict two different transport tracks 8 and 9. In FIG. 1, the transport track is applied on a flat terrain and in FIG. 2 on a rising terrain, and in each case has a departure point 10 and an arrival point 11.

The transport track 8 comprises, at the start, a possibly, but not necessarily, short rising section of track 12'. At the summit 13 of this section 12', the track follows a descending track section 14'. The descending track section must be designed according to the terrain so as not to obtain an excessively steep slope, causing a continuous acceleration of the vehicles running on the track. In this example embodiment, the slope is planned at $4/1000$. Assuming therefore that the terrain is at elevation 0, and that the elevation at the summit 13 is 4 m, a vehicle descending on the section 14' can travel freely at a constant speed over a distance of 1000 m. Obviously the departure point may often be situated at a higher elevation than 4 m. For example, the containers stacked on a vessel may at the outset have an elevation of 30 m and more. Rather than unloading them onto the quay and then stacking them once again in order to store them, it would therefore be possible from the outset to profit from this initial height in order to enable the unloaded containers already to travel a significant distance. At an elevation 20 m at the start, the container can achieve a distance of 5 km.

FIG. 1 also illustrates how to pursue travel on flat terrain over a long distance from a departure point 10. There are in succession ascending sections 12', 12" and 12'" and descending sections for the gentle slope 14', 14" and 14'". The expenditure of energy to be made for a vehicle to travel between a departure point and an arrival point on a transport track where the descending sections have a slope of $4/1000$ is in theory the same if the track comprises a single ascending section 12 and a single descending section 14 or for several alternating ascending and descending sections. For reasons of expenditure on infrastructure it is obviously more economical to divide the transport track, as illustrated in FIG. 2, into small successive sections so as to be able to best profit from the variations in elevation on the terrain. The most appropriate route can be calculated in a known manner from elevation data existing at the present time.

As is clear from FIG. 2, when the track comprises several successive ascending and descending sections, a vehicle on this track must not exceed in height the path that this vehicle would follow if the track comprises only a single descending section 14 having the minimum energy slope (as illustrated in broken lines in FIG. 2).

If a vehicle is situated higher than this path, it will have to descend at a greater slope in order to arrive at 11, and it will therefore have to brake in order to maintain its constant speed. As soon as, on a point on the track, the vehicle reaches this single descending section, it is preferably for it to continue to follow this path until the arrival point. If it redescends below, it first of all travels at a steeper slope where braking will prove to be necessary and it will have to either make the rest of the travel at a more gentle slope than the slope determined according to the invention, with the risk of stopping en route, the force of gravity providing insufficient to balance the resistance to running added to the other aforementioned resistances, or pass over a new ascending track section, which could have been avoided.

The downward slope of the descending section must therefore be sufficient to overcome the resistance to running of the wheels 5 on the rails 1 and 2. According to this resistance, which can be calculated easily by a person skilled in the art, and which varies in particular according to the materials used for the rails and for the wheels, the slope will be determined so that the vehicle is necessarily driven on the rails by gravity, and therefore is not stopped by the friction forces. Moreover this slope must not be too great and cause a continuous acceleration of the vehicle on the descending section. On the contrary, the slope must be as gentle as possible, so as to achieve an equilibrium between the acceleration of the vehicle and the resistances that are opposed to it, in particular the resistance to running and the resistance to air. For metal wheels on metal rails it can be estimated that a slope of at least $3/1000$, preferably around $4/1000$, is appropriate. This slope is preferably constant and therefore allows movement of the containers at constant speed, preferably around 30 to 50 km/h, advantageously around 40 km/h, on a path as long as possible.

FIG. 2 illustrates an example embodiment of a transport track where the departure point 10 is situated at an elevation lower than the arrival point 11. As in the previous case a succession of ascending sections 12', 12", 12''' and descending sections 14', 14", 14''' is provided. All the descending sections are provided with the minimum energy slope forming an angle □ with respect to the horizontal. The ascending sections have a different rising angle according to the existing elevation which is illustrated by the curve 30.

In the case illustrated in FIG. 2, the route that the vehicle would follow if the transport track had a single descending section 14 starts at the departure point 10, at a height corresponding to the sum of the height H between the arrival point 11 and the departure point 10 and the height h of minimum slope for the route to form an angle p with the horizontal over the entire length of the track. According to the invention the vehicle cannot exceed in height this route formed by the single section 14.

As can be seen, the elevation 30 can have in a direct line elevations and depressions that are sometimes large. In the case of such slopes, in order to be able to follow the minimum energy slope, without having to require infrastructure works at exorbitant cost such as bridges or tunnels, the route will follow a winding path, not shown, according to the elevation, which will make it possible to avoid these differences in elevation.

The application of a constant gentle speed to the containers passing over a transport track offers the advantage that the containers remain equidistant, at least if their useful load is not too variable.

It is obviously that, in certain circumstances, some variables are to be taken into account, such as the wind, which may change direction, or the useful load of the containers or their respective tare weight.

It is therefore preferable to provide means of balancing the speed of the successive containers, which will because of this maintain distance between vehicles.

As is clear in particular from FIG. 6, the containers, travelling freely in the direction of the arrow F, are provided with powerful clamps 15, which have a clamping capacity of, for example, 5000 N, with a coefficient of friction of 0.4, and which are fixed to runners 21 on the bogies. These clamps are disposed on each side of the length 16 of a cable 17 which is provided along the transport track parallel to it. This endless cable is returned by two return pulleys and extends over a predetermined length, greater than the distance that they must keep between them, this length being for example 25 m. Advantageously, corresponding clamps and cables are disposed on both sides of the container. On one side of the transport track, an endless cable 17 succeeds another 17' continuously over the entire track. The same applies on the other side, but in an offset manner, so that clamps are constantly cooperating with at least one cable over the entire length of the transport track. The clamps in the clamped state can advantageously exert a traction on the cable of around 2000 N and therefore, when a container passes, the cable 17 and cable disposed on the other side of the container are driven so as to turn around the pulleys 18.

Figure 7:
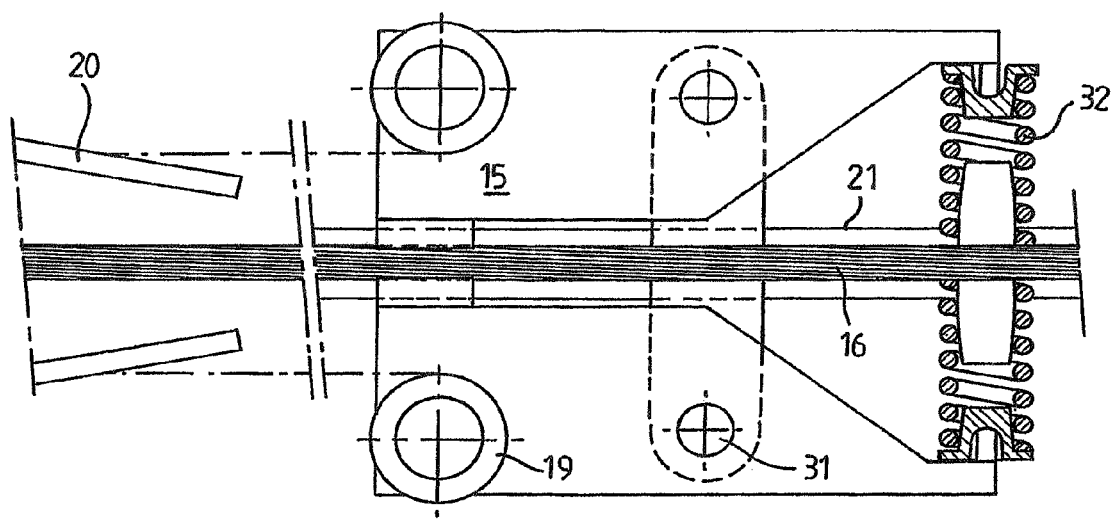
FIG. 7 depicts a detailed plan view of a cable gripping device that can be used in a system according to the invention.

The jaws of the clamps are, in the example illustrated (see in particular FIGS. 6 and 7), equipped with small wheels 19 mounted on a bearing and intended to open the clamps when they come into contact with a separator 20. At the time of this contact, the wheels 19 separate the clamps by pivoting about axes 31 and release the cable, which thus allows passage at the pulleys 18, the wheels 19 and clamps 15 being elastically returned into place by a spring 32 as soon as wheels 19 cease to be in contact with the separator 20.

If the speed of a container is such that it has a tendency to approach the previous container because its speed is slightly greater than the predetermined constant speed, it will approach it up to a distance of 25 m, and then at least one of its clamps 15 will begin to grip the same cable 17 as the previous container. This will cause a rebalancing between the speed of the two containers, and therefore a braking of one and an acceleration of the other. This braking will be expressed by a tendency to slide towards the rear of the runner 20, in the opposite direction to F. As soon as this sliding force exceeds the force of the return spring 22, the rearward sliding becomes effective and the axes 23 of the brake shoes 24 can descend into the vertical oblong openings 25, the container then being braked by friction of the shoes on the rails. As soon as the speed of the two containers has become balanced, the return spring returns the runner 21 into its initial high position and the braking ceases.

Likewise, by the simultaneous gripping of the same cable 17 by the two containers which follow each other, the first container, which is slower, is caused to accelerate since the two containers and the cable can now form merely a single assembly, obliged to move at the same speed.

In the example illustrated in FIG. 6, the bogies of the container are also advantageously provided with an immobilisation device which detects, by means of the cables 17, 17', the correct or faulty functioning of the system according to the invention. In the case of track rupture, for example, the broken cable 17 slackens and releases a lever 33 whose arm 34 is, in normal operation, maintained in the position illustrated in FIG. 6 by the tension on the successive cables. The lever arm 34 thus released is lifted under the tension of a return spring 37 and then by the driving of the wheels and pivots upwards about the axis 35 whilst the other lever arm 36 pushes the runner 21 towards the left in FIG. 6. The shoe 24 is then, as explained previously, lowered onto the rail, and its adhesion will cause the straightening up of the levers 38 in the direction of the arrow 39 as far as the vertical, causing a lifting of the wheels with respect to the rail and therefore a total immobilisation of the container.

The immobilised container stops the circulation of the cable situated on the side of the container opposite to that which has been broken, which causes the immobilisation of any container already connected to this cable by clamps or coming to grip this cable. Consequently the stoppage is transmitted immediately by this transmission to all the containers on the track.

It must be understood that the present invention is in no way limited to the embodiments described above, and that many modifications can be made thereto without departing from the scope of the accompanying claims.

It can for example be envisaged applying the transport system according to the invention to replicas in the form of small-scale models and toys.

The invention claimed is:

1. Transport system, comprising
   a transport track formed by at least one running rail,
   several vehicles to be transported, and
   a rolling device connected to each vehicle and arranged on the said at least one running rail so as to be able to roll thereon, the vehicle provided with the rolling device having a rolling resistance on the said at least one rail,
   the said transport track having several descending track sections, each descending track section having a slope that is sufficient to overcome said rolling resistance of each vehicle, each vehicle thus rolling on the said at least one descending track section by simple gravity,
   wherein the transport track has a starting point and an arrival point, said starting point having an elevation equal to or higher than the starting point,
   wherein said starting point and arrival point are different, so that the transport track does not form a closed loop,
   wherein between said descending track sections there is in each case arranged a section of ascending track on which each vehicle provided with the rolling device is driven by a driving device,
   wherein the slope of each descending track section is insufficient to produce a continuous acceleration of said vehicles on the said at least one running rail, each vehicle having a substantially constant speed, and
   wherein the transport track has a route along which no vehicle at any point is raised higher than the elevation that the vehicle would have at this point on a transport track having a single descending track section between the starting point and the arrival point, provided with the same slope as said several descending track sections,
   said transport system further comprising means for balancing the speed of two successive vehicles on said descending track sections, so as to maintain a distance between said two successive vehicles, said means for balancing the speed of two successive vehicles on said descending track sections comprising at least one endless cable returned freely in a loop by pulleys along the transport track and clamps arranged on each vehicle to grip the cable and drive the vehicle during transport.

2. Transport system according to claim 1, wherein the above-mentioned slope is at least 3/1000, preferably at least 4/1000.

3. Transport system according to claim 1, wherein the slope of said several descending track sections is constant over each descending track section.

4. Transport system according to claim 1, wherein the substantially constant speed of the said at least one vehicle on the descending sections is around 30 to 50 km/h, preferably around 40 km/h.

5. Transport system according to claim 1, wherein the driving devices drive each vehicle on the ascending track sections at a speed equal to said substantially constant speed of the vehicle on the descending track sections.

6. Transport system according to claim 1, wherein the transport track comprises, at least on one section, support means for an overhead rail and in that each vehicle is suspended from this overhead rail by the rolling device.

7. Transport system according to claim 1, wherein the said at least one vehicle is a container to be transported which has a volume, and in that the rolling device is fixed to the container in such a manner that it can be folded into the volume of the container, when the container is at rest.

8. Use of a transport system according to claim 1, for transporting vehicles over long distances, comprising reading geographic elevations for the departure point and the arrival point of the transport track of said transport system and determining a route for said transport track on the basis of the geographic elevations, so as to minimise the number of ascending sections on said transport track.

* * * * *